March 3, 1942.  G. A. LYON  2,274,719
METHOD OF AND MEANS FOR APPLYING ORNAMENTATION
Filed Oct. 6, 1939  2 Sheets-Sheet 1
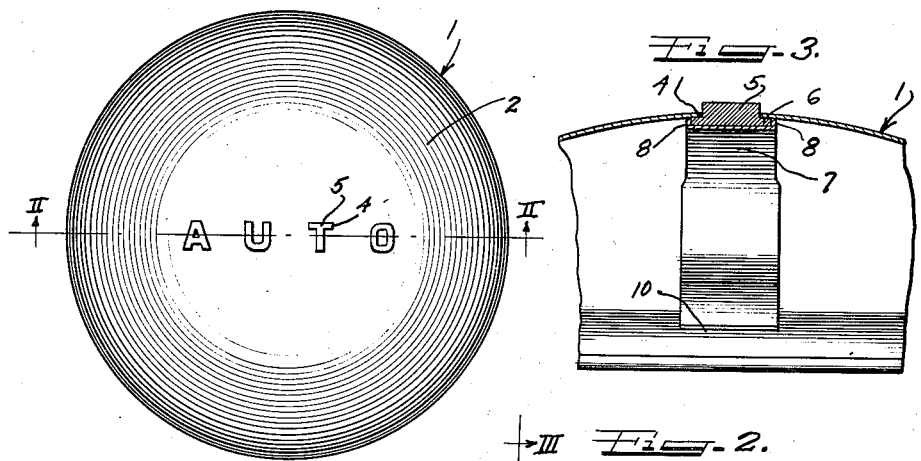
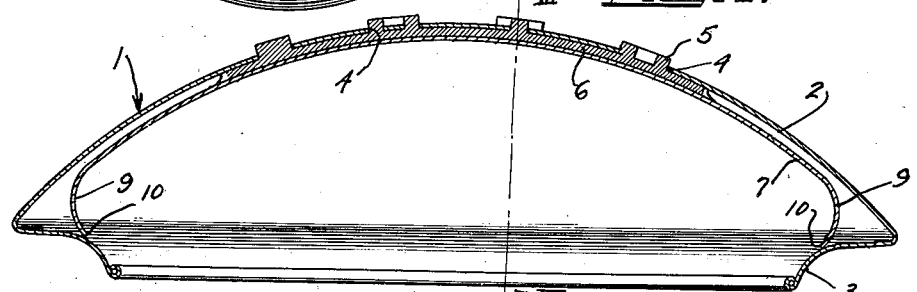
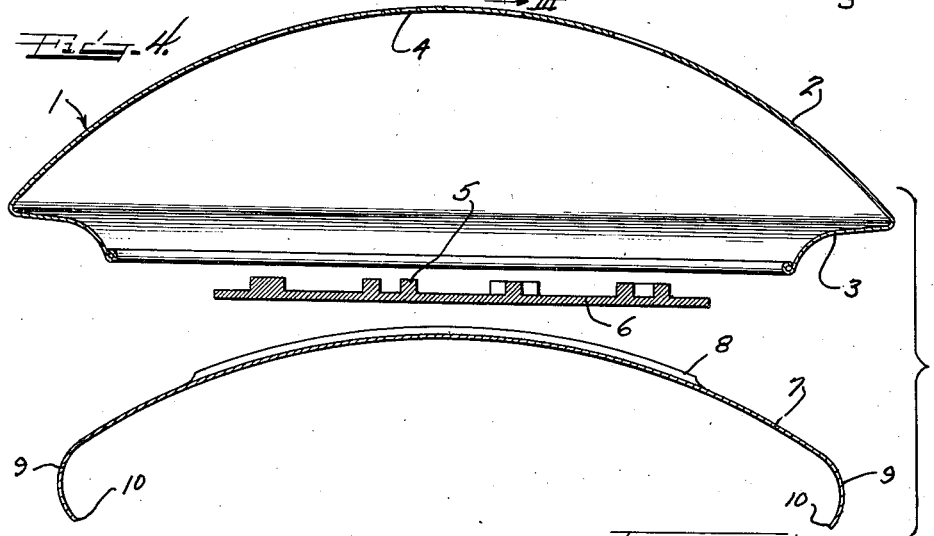
Inventor
GEORGE ALBERT LYON.

March 3, 1942.　　　G. A. LYON　　　2,274,719
METHOD OF AND MEANS FOR APPLYING ORNAMENTATION
Filed Oct. 6, 1939　　　2 Sheets-Sheet 2
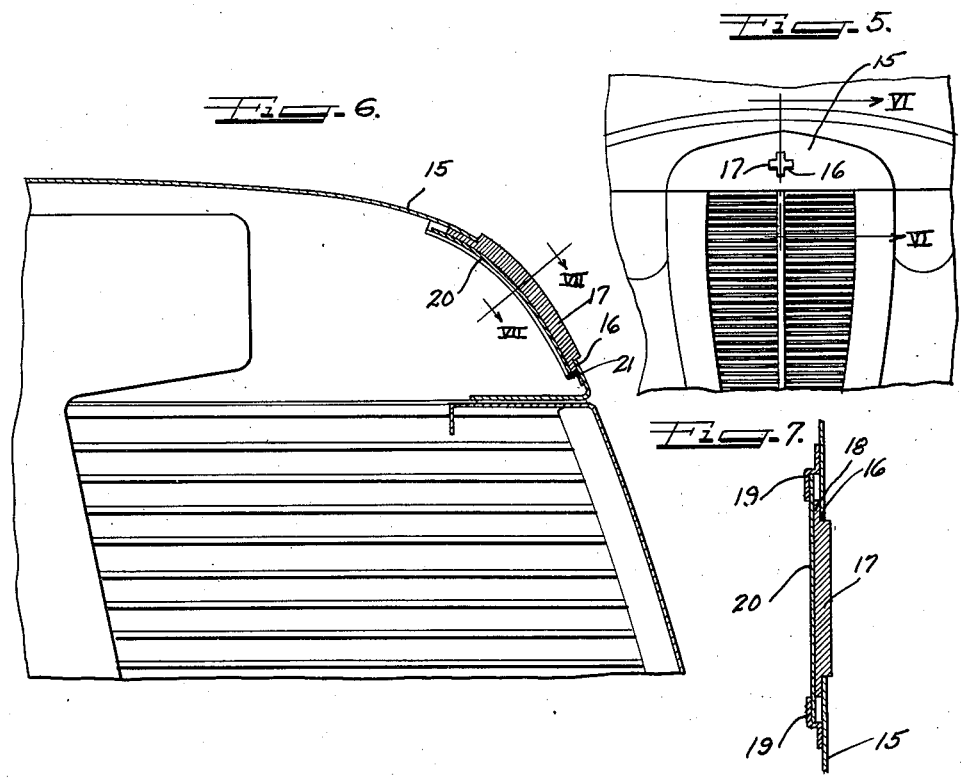
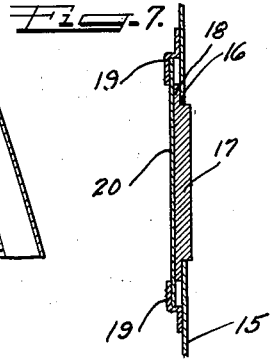
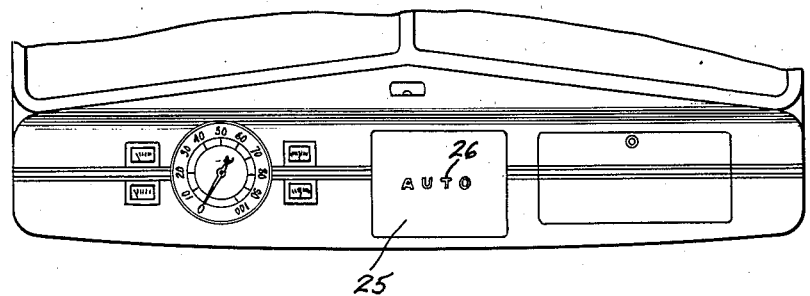
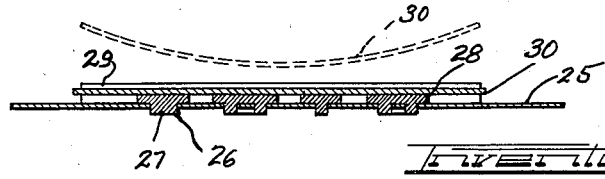
Inventor
GEORGE ALBERT LYON.

Patented Mar. 3, 1942

2,274,719

UNITED STATES PATENT OFFICE 2,274,719

METHOD OF AND MEANS FOR APPLYING ORNAMENTATION

George Albert Lyon, Allenhurst, N. J.

Application October 6, 1939, Serial No. 298,223

6 Claims. (Cl. 40—135)

This invention relates to a method of and means for applying ornamentation, and more particularly to the ornamentation of parts of a vehicle such as wheel hub caps, radiator hoods, instrument dash panels, and the like.

An object of this invention is to provide an improved way of attaching ornaments such as letters, insignia, shields, name plates, and the like to parts of an automotive vehicle so that such ornaments present a very pleasing appearance to the eye and the retaining means for holding such ornaments in place is not visible.

Still another object of this invention is to provide an improved method of and means for retaining one or more ornaments in an apertured wall so that such ornaments are visible from the external surface of the wall and the means for retaining such ornaments in place is concealed by the wall itself.

In accordance with the general features of this invention, there is provided an ornamentative device having an apertured wall and through the aperture or apertures thereof extend one or more ornaments such as letters, insignia, and the like, the ornaments extending outwardly through the openings and being resiliently retained in place in the openings by pressure applying means disposed to the rear of the apertured wall.

In accordance with other features of the invention, my aforesaid ornamental structure is applied to a number of different modifications, including a wheel hub cap, a radiator hood, and an instrument dash panel.

Other objects and features of this invention will more fully appear from the following detailed description taken in connection with the accompanying drawings which illustrate several embodiments thereof, and in which:

Figure 1 is outer side view of an automobile hub cap embodying the features of this invention;

Figure 2 is an enlarged cross sectional view taken on the line II—II of Figure 1 looking in the direction indicated by the arrows and showing clearly how the hub cap is ornamented in accordance with the features of this invention;

Figure 3 is a fragmentary cross sectional view taken on the line III—III of Figure 2 looking in the direction indicated by the arrows;

Figure 4 is an exploded sectional view of the hub cap illustrated in Figure 2 and showing how the ornamental strip with letters thereon on the retaining spring are disposed relative to each other in the application of the ornamental assembly to the hub cap proper;

Figure 5 is a fragmentary front view of an automobile radiator showing my invention applied thereto;

Figure 6 is an enlarged fragmentary cross sectional view taken on the line VI—VI of Figure 5 looking in the direction indicated by the arrows and showing clearly the features of my ornamental structure inside the radiator hood;

Figure 7 is a fragmentary sectional view taken on the line VII—VII of Figure 6 looking in the direction indicated by the arrows;

Figure 8 is a view of an automobile instrumental panel showing my invention applied thereto; and Figure 9 is an enlarged fragmentary sectional view taken on the line IX—IX of Figure 8 looking downwardly and illustrating in dotted lines how the retaining spring is applied to the rear of the assembly.

Since it is believed that my novel method will be fully understood from a description of the ornamental devices made by practicing my method, the following description will be confined to an explanation of the different forms of my invention.

As shown on the drawings:

The reference character 1 designates generally an automobile cover member or hub cap which includes a dome or crown portion 2 and an inwardly radially and axially extending skirt 3 for cooperation with retaining means on the wheel. Since any suitable retaining means may be provided for holding this cap on a wheel, I have not illustrated any specific form of retaining means.

The hub cap is preferably made of a stamping of light sheet material which may be stainless steel or may be of any other suitable metal preferably having a high finish such as a chromium plated exterior surface.

The crown portion of the hub cap, as is well known, is adapted to have disposed thereon the name or insignia of the vehicle to which the cap is applied. Heretofore, it has been the practice to either press that ornament in the crown portion of the cap or else to apply a suitable ornament by means of fastening means such as rivets, pins, or the like. Also, it has been the practice heretofore to apply such ornaments in the form of a continuous strip in which the individual letters do not necessarily stand out separate and distinct from each other.

The aim of my invention is to provide a way of attaching such ornamentation, which may be letters as illustrated, so that the letters will stand out against the backing of the highly finished outer surface of the crown portion 2 but will not appear as running together in a single strip formation.

In order to illustrate my invention, I have adopted the letters "Auto" as the ornament or insignia being applied to the hub cap. It is, of course, to be understood that when I refer to "ornament" in the specification or the accompanying claims I do not intend that my invention should be limited to lettering alone, since it is evident that my invention is equally applicable to other types of ornaments, such, for example, as a trade-mark, insignia, or other designating characteristics that might be used to identify or beautify the product being ornamented. For example, the ornament might consist of a particular trade-mark, such as a circle with a "V-8" in it, or a cross such as shown in Figure 5, and which will be described when that form of the invention is specifically referred to hereinafter.

In order to apply my invention to the hub cap, the hub cap is initially blanked or perforated to provide holes of the same shape as the ornament or letters to be fitted therein. These holes have the same outer contour as that of the letters, numerals, or other insignia to be inserted through the holes. I have designated the holes in the crown portion by the reference character 4.

Inserted through these holes from the rear side of the crown portion 2 are a plurality of letters 5 which may be attached to or comprise integral components of a common flexible strip or support 6. If so desired, these letters may be made separately from the strip and later secured thereto.

I preferably make the letters and the strip of the same flexible material. For example, the material used may be a plastic, a die casting, a rubber molded part, or a metallic stamping. Any suitable metal, plastic, or rubber part may be used as long as such material is suitable for the purpose of providing the desired ornamentation.

I have in a device constructed to embody my invention employed plastic colored material having a lustrous and semitransparent effect. This material, when offset against the highly lustrous finished outer surface of the crown portion 2, enables a very pleasing ornamental effect.

In order to retain the strip 6 and the ornaments or letters 5 in cooperation with the apertures 4 in the hub portion 2, I have provided a novel retaining means in the form of a resilient or spring steel strip 7, as shown in elevation in Figure 4. This strip 7 has its side edges provided with spaced upwardly extending side flanges 8 (Figures 3 and 4) which embrace the side edges of the letter supporting strip 6. The spring strip 7 is generally of a bowed shape and has its ends curved as indicated at 9. The ends 10 of this bowed strip 7 are adapted to have biting and retaining cooperation with an inner surface of the skirt or flange portion 3 of the hub cap, as shown in Figure 2.

In the assembly of the device, the letters 5 are first inserted through the holes 4, and the integral supporting strip 6 is bowed or curved to conform with the curvature of the inner surface of the crown portion 2. This support 6 and the letters 5 are then temporarily held in that position while the spring retaining strip or clip 7 is inserted endwise bodily through the rear opening of the hub cap and snapped into the retained position shown in Figure 2. In this process of applying the spring, the ends 9 are resiliently bent so as to pass through the beaded edge of the hub cap skirt 3 whereby the ends 3 are thereafter free to resiliently spring outwardly into retaining cooperation with the inner surface of the skirt or flange 3. When in this position, the strip 6 is maintained in a curved or bowed shape and is forced into tight cooperation with the inner surface of the crown portion 2 with the letters 5 projecting through the openings 4. When in this position, the support 6 which is integral with the letters 5 necessarily prevents the letters from falling out of or being pushed through the openings 4 by reason of the fact that the strip or support 6 constitutes a shoulder for abutting the inner surface of the drum portion 2.

Of course, it is evident that the supporting strip 6 instead of initially being in a flat form may be initially pre-formed or cast into the ultimate desired curved shape, so that no bending of that strip is necessary in its application to the hub cap. However, by making it in the form illustrated, the strip 6 is held under greater tension when it is retained in position on the hub cap.

In Figures 5 to 9 inclusive, I have illustrated two other embodiments of my invention, to which, however, the remarks given above in connection with the first illustrated form of the invention are generally applicable.

In the form shown in Figures 5 to 7 inclusive, the ornamental device is illustrated as being applied to the front of an automobile radiator hood designated generally by the reference character 15. This part 15 comprises an apertured wall in which the ornament receiving aperture, which is illustrated as being in the shape of a cross, is designated by the reference character 16. Projecting through this aperture or hole 16 is the ornament 17 which on its rear side is provided with a flange 18 for abutting the inner surface of the part 15. This flange 18 serves as an abutment or shoulder to prevent the ornament from passing clear through and falling out of the opening 16.

In order to retain the ornament in position in the opening 16, there is provided on the rear side of the part 15 a spring retaining strip 20 which is slid endwise through a pair of supporting slide or guide flanges 19 (Figure 7). In applying this resilient strip 20 to the assembly, it is resiliently and progressively bent into arcuate form as it is slid endwise downwardly into the two slide or guide flanges 19.

In order to limit downward movement of the strip 20, there may be provided at the lower end of the assembly a stop flange 21, against which the lower end of the strip is adapted to abut after it has been slid completely into position behind the ornament 17.

It is evident from the foregoing that due to the fact that the strip 20 is resiliently bowed or bent in such a manner that it tends to spring outwardly after it has been mounted in the slide rails 19, it will exert an outward pressure against the ornament 17 to tightly hold the ornament in position with the flange 18 abutting the inner surface of the apertured wall 15.

In Figures 8 and 9, I have illustrated a third embodiment of my invention in which the apertured wall comprises a portion 25 of an automobile instrument panel.

This apertured wall 25 has a plurality of letter receiving openings designated generally by the reference numeral 26. Each of these openings is adapted to have extended therethrough a letter 27. It will be noted that the ornament in this form of the invention comprises the letters "AUTO", and hence the remarks given in connection with the first described form of my invention are also applicable to this form. However, in this form of the invention the letters 26 are individual and separate letters and are not connected to a common strip. Instead each of the letters is provided with an abutment flange 28 for abutting the rear surface of the apertured wall 25 to prevent the letters from falling out of the openings. The letters and their flanges are held in place in the openings by means of a spring strip 30 which is slid endwise through a pair of spaced guide rails 29 similar to the guide rails 19 of the previously described form of the invention. Initially the strip may be bowed to the form shown in Figure 9, and thereafter when it is slid endwise between the spaced guide rails 29, it is placed under a tension so that it exerts an outward force which reacts against the letters 27 to force them outwardly through the openings. In other words, this spring pressure forces the flanges 28 of the letters tightly against the rear surface of the apertured wall 25.

From the foregoing, it is apparent that all forms of my invention have the common feature of ornaments extended outwardly through one or more openings in an apertured wall and retained in position by means of abutments on the rear of the wall and by spring pressure applied in such a manner as to force these abutments into tight cooperation with the inner surface of the apertured wall.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In an ornamentative device having an apertured wall provided with a plurality of apertures corresponding in shape to that of ornaments such as insignia, letters and the like to be disposed therein, ornaments fitted from the rear through said apertures in said wall so as to be visible on the outer side of said wall, said ornaments on the rear side of said wall being connected by a common flange forming a shoulder for engaging the surface of said wall to retain the ornaments from falling out of said apertures, resilient means on the rear side of said wall for pressing against said flange to force said ornaments outwardly through said apertures and to hold said shoulder tightly against the rear surface of said wall, said wall having flange means retainingly cooperable with said resilient means, said flange comprising a flexible strip flexed by said resilient means to a shape corresponding to that of the rear surface of said wall so as to hold said flange tightly against said wall.

2. In an ornamentative device, a support having an apertured wall the aperture of which corresponds in shape to that of an ornament to be applied thereto, an ornament fitted from the rear through the aperture in said wall so as to be visible on the outer side of said wall, said ornament having a shoulder engaging the rear surface of said wall to retain the ornament from falling out of said aperture, and resilient means on the rear side of said wall for pressing said ornament outwardly through said aperture and to hold said shoulder tightly against said rear surface, said wall constituting a dome portion of a wheel cover and including rearwardly extending flange means retainingly cooperable with said resilient means, and said resilient means comprising a bowed spring snapped into retained engagement with said flange means of said cover member.

3. In an ornamentative device having an apertured wall provided with a plurality of apertures corresponding in shape to that of ornaments such as insignia, letters and the like to be disposed therein, ornaments fitted from the rear through said apertures in said wall so as to be visible on the outer side of said wall, said ornaments on the rear side of said wall being connected by a common flange forming a shoulder for engaging the surface of said wall to retain the ornaments from falling out of said apertures, and resilient means on the rear side of said wall for pressing against said flange to force said ornaments outwardly through said apertures and to hold said shoulder tightly against the rear surface of said wall, said wall comprising the dome part of an automobile wheel hub cap including an inwardly turned skirt for cooperation with the wheel, and said resilient means comprising a strip of resilient material having its ends snapped into engagement with diametrically opposite portions of the inner surface of said skirt and having its intermediate portion bowed outwardly so as to press against said ornaments.

4. As an article of manufacture, a wheel cover member or hub cap including a dome portion and an inwardly turned rearwardly extending skirt on its rear side, said dome portion having one or more apertures therein corresponding in shape to that of one or more ornaments disposed in said apertures, one or more ornaments such as insignia or the like disposed in said apertures and extending outwardly through the apertures so as to be visible from the outer surface of said dome portion, said ornaments having shoulder means on the rear side of the dome portion for engaging the rear surface thereof to prevent said ornaments from falling outwardly through said apertures, and resilient means inside of said cap comprising a strip of metal having its ends flexed into a snap-on engagement with the inner surface of said skirt and having its central portion bowed outwardly into resilient and pressure-applying engagement with said ornaments to hold said ornaments in position in said dome portion.

5. As an article of manufacture, a wheel cover member or hub cap including a dome portion and an inwardly turned rearwardly extending skirt on its rear side, said dome portion having one or more apertures therein corresponding in shape to that of one or more ornaments disposed in said apertures, one or more ornaments such as insignia or the like disposed in said apertures and extending outwardly through the apertures so as to be visible from the outer surface of said dome portion, said ornaments having shoulder means on the rear side of the dome portion for engaging the rear surface thereof to prevent said ornaments from falling outwardly through said apertures, and resilient means inside of said cap comprising a strip of metal having its ends flexed into a snap-on engagement with the inner surface of said skirt and having its central portion bowed outwardly into resilient and pressure-applying engagement with said ornaments to hold said ornaments in position in said dome portion, said ornaments being mounted on a single strip of flexible material which is flexed into a shape corresponding with that of the inner surface of said dome portion by said resilient means so as to hold said strip tightly against said rear surface.

6. In an ornamentative device having an aperture curved wall provided with an aperture corresponding in shape to that of an ornament such as insignia, a letter and the like to be disposed therein, an ornament fitted from the rear through said aperture in said wall including a strip of bowed shape and a portion projecting beyond said aperture so as to be visible on the outer side of said wall, said ornament strip on the rear side of said wall having a flange forming a shoulder for overlapping and engaging the under surface of the margin of said wall about said aperture to retain the ornament from falling out of said aperture, and resilient means on the rear side of said wall for pressing against said flange to force said ornament outwardly through said aperture and to hold said shoulder tightly against the rear surface of said wall, said wall having flange means spaced rearwardly therefrom and said resilient means comprising a normally substantially flat resilient strip flexed and bowed under tension with portions thereof disposed behind said flange means and in said space between said wall and flange means.

GEORGE ALBERT LYON.